(12) United States Patent
Badesha et al.

(10) Patent No.: US 6,733,839 B2
(45) Date of Patent: May 11, 2004

(54) FUSER MEMBER COATING COMPOSITION AND PROCESSES FOR PROVIDING ELASTOMERIC SURFACES THEREON

(75) Inventors: Santokh S. Badesha, Pittsford, NY (US); Clifford O. Eddy, Webster, NY (US); David J. Gervasi, West Henrietta, NY (US); George J. Heeks, Rochester, NY (US); Arnold W. Henry, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/385,978

(22) Filed: Mar. 10, 2003

(65) Prior Publication Data

US 2004/0018310 A1 Jan. 29, 2004

Related U.S. Application Data

(62) Division of application No. 10/040,135, filed on Jan. 8, 2002, now abandoned, which is a division of application No. 09/416,149, filed on Oct. 11, 1999.

(51) Int. Cl.$^7$ .................................................. B05D 3/02
(52) U.S. Cl. ...................................... 427/386; 427/387
(58) Field of Search .............................. 427/385.5, 386, 427/387

(56) References Cited

U.S. PATENT DOCUMENTS

| | | | |
|---|---|---|---|
| 3,876,654 A | 4/1975 | Pattison | 260/38 |
| 4,272,179 A | 6/1981 | Seanor | 355/3 FU |
| 4,395,462 A | 7/1983 | Polmanteer | 428/420 |
| 4,399,553 A | 8/1983 | Toyama | 382/7 |
| 4,684,238 A | 8/1987 | Till et al. | 355/10 |
| 4,690,539 A | 9/1987 | Radulski et al. | 355/3 |
| 5,099,286 A | 3/1992 | Nishise et al. | 355/272 |
| 5,110,702 A | 5/1992 | Ng et al. | 430/99 |
| 5,119,140 A | 6/1992 | Berkes et al. | 355/273 |
| 5,150,161 A | 9/1992 | Bujese | 355/256 |
| 5,166,031 A | 11/1992 | Badesha et al. | 430/124 |
| 5,337,129 A | 8/1994 | Badesha | 355/275 |
| 5,366,772 A | 11/1994 | Badesha et al. | 428/35.8 |
| 5,370,931 A | 12/1994 | Fratangelo et al. | 428/334 |
| 5,456,987 A | 10/1995 | Badesha | 428/421 |
| 5,547,759 A * | 8/1996 | Chen et al. | 219/244 |
| 5,736,250 A | 4/1998 | Heeks et al. | 428/447 |
| 5,765,085 A | 6/1998 | Law et al. | 399/329 |
| 6,103,815 A * | 8/2000 | Mammino et al. | 524/546 |
| 6,159,588 A | 12/2000 | Eddy et al. | 428/215 |

FOREIGN PATENT DOCUMENTS

| EP | 018140 | * 10/1980 |
|---|---|---|
| EP | 1093032 | * 4/2001 |

* cited by examiner

*Primary Examiner*—Erma Cameron
(74) *Attorney, Agent, or Firm*—Annette L. Bade

(57) ABSTRACT

Fuser members and processes are provided for crosslinked fluorocarbon elastomer surfaces containing a fluorocarbon elastomer and a non-amino crosslinker together with methods for providing a crosslinked fluorocarbon elastomer surface on a fuser member supporting substrate which include mixing together an acid acceptor, an emulsifier, water, and non-amino based crosslinker with a latex fluorocarbon elastomer.

14 Claims, 1 Drawing Sheet

FUSER MEMBER COATING COMPOSITION AND PROCESSES FOR PROVIDING ELASTOMERIC SURFACES THEREON

CROSS-REFERENCE TO RELATED APPLICATIONS

This is a divisional of U.S. application Ser. No. 10/040,135 filed Jan. 8, 2002, abandoned, which is a division of Ser. No. 09/416,149 filed Oct. 11, 1999, by the same inventors, and claims priority therefrom.

BACKGROUND OF THE INVENTION

The present invention relates to fuser members and to processes for providing elastomer surfaces on a substrate. More specifically, the present invention relates to members comprised of a substrate and thereover a crosslinked latex fluoroelastomer surface in which members can be selected for a supporting substrate useful in electrostatographic processes, inclusive of digital processes and devices. The present invention provides an environmentally friendly fluorocarbon elastomer surface for a fuser system member with the positive features of having chemical, physical and thermal stability, along with sufficient toughness to resist wear and tear.

The invention dispenses with the additional costs associated with materials such as organic solvents and further, dispenses with the need for their disposal. This helps prevent air pollution and provides an environmentally friendly latex fluorocarbon elastomer emulsion. In addition, the present invention minimizes the need for functional fusing oils which are normally necessary to prevent toner from adhering to the surface of the fuser member. Nonfunctional fuser oils would be preferred due to economic considerations. Moreover, the present invention provides a fusing system member which has sufficient toughness, along with excellent chemical, physical and thermal stability, and other properties allowing for a larger fusing latitude at higher temperatures (400–450° F.) and decrease in the problems associated with hot offset.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support, which may be the photosensitive member itself or another support sheet such as plain paper.

Thermal energy is commonly used for fixing toner images onto a support member. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools and solidifies, it becomes firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or to catch fire at such elevated temperatures, particularly when the substrate is paper.

Several approaches for accomplishing thermal fusing of electroscopic toner images have been described. These methods include providing the application of heat and pressure substantially concurrently by various means, such as by a roll pair maintained in pressure contact, a belt member in pressure contact with a roll, and other equivalent means recognized in the art. Heat may be applied by heating one or both of the rolls, the plate members or belt members. Fusing of the toner particles takes place when the proper combination of heat, pressure and contact time is provided. Various strategies for balancing these parameters to bring about the fusing of the toner particles have been described in the art, and it is recognized that the parameters can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affects the fusing of the toner image onto the support. It is important in the fusing process that no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly, fusing surfaces with a low surface energy which provide the necessary release are desirable. To ensure and maintain good release properties of the fuser roll, it has become customary to apply release agents to the fuser roll during the fusing operation. Typically, these materials are applied as thin films of, for example, silicone oils, to prevent toner offset.

Particularly preferred fusing systems are comprised of a heated cylindrical fuser roll having a fusing surface that is backed by a cylindrical pressure roll forming a fusing nip there-between. A release agent donor roll is also provided to deliver release agent to the fuser roll. While the physical and performance characteristics of each of these rolls, and particularly of their functional surfaces, are not precisely the same because of the various characteristics of the fusing system desired, the same classes of materials are typically used for one or more of the rolls in a fusing system in an electrostatographic printing system.

In U.S. Pat. No. 5,736,250, the disclosure of which is incorporated by reference in its entirety, there is described crosslinked fluorocarbon elastomer surfaces comprising a fluorocarbon elastomer and an amino siloxane and a method for providing a crosslinked fluorocarbon elastomer surface on a fuser member supporting substrate which includes mixing together an acid acceptor, an emulsifier, water, and amino siloxane with a latex fluorocarbon elastomer.

In U.S. Pat. No. 5,166,031, the disclosure of which is incorporated by reference in its entirety, there is illustrated a fuser member comprising a supporting substrate having an outer layer of a volume grafted elastomer which is a substantially uniform integral interpenetrating network of a hybrid composition of a fluoroelastomer and a polyorganosiloxane, the volume graft having been formed by dehydrofluorination of a fluoroelastomer by a nucleophilic dehydrofluorinating agent, followed by addition polymerization by the addition of an alkene or alkyne functionally terminated polyorganosiloxane and a polymerization initiator, and wherein the fluoroelastomer can be selected from a group consisting of poly(-vinylidene fluoride-hexafluoropropylene) and poly(vinylidene fluoride-hexafluoropropylene-tetrafluoroethylene).

U.S. Pat. No. 5,366,772, the disclosure of which is incorporated by reference in its entirety, describes an outer layer of a fuser member comprised of a substantially uniform integral interpenetrating hybrid polymeric network comprised of a haloelastomer, a coupling agent, a functional polyorganosiloxane and a crosslinking agent. The hybrid polymeric network is formed by the sequential reaction of the haloelastomer with a dehydrohalogenating agent, reaction with the coupling agent, condensation with the functional polyorganosiloxane and crosslinking with the crosslinking agent.

U.S. Pat. No. 5,370,931, the disclosure of which is incorporated by reference in its entirety, describes a grafted elastomer which is a substantially uniform integral interpenetrating network of a hybrid composition of a fluoroelastomer and a polyorganosiloxane, said graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator; and wherein said outer layer contains copper oxide in an amount of from about 2 to about 7 weight percent based upon the total weight of said outer layer.

U.S. Pat. No. 5,456,987, the disclosure of which is incorporated by reference in its entirety, describes an intermediate transfer member having a layer comprised of a grafted titamer formed using a coupler having at least one pendant silane group.

U.S. Pat. No. 5,337,129, the disclosure of which is incorporated by reference in its entirety, describes an intermediate transfer member comprising a substrate and a coating comprised of integral, interpenetrating networks of haloelastomer, silicon dioxide and optionally polyorganosiloxane coupled using an amine coupler having at least one pendant functional group such as silane.

U.S. Pat. No. 4,399,553, the disclosure of which is incorporated by reference in its entirety, describes a water-based fluoroelastomer coating composition comprising a fluoroelastomer and an amino silane.

There is also known a water-based fluoroelastomer coating composition comprising an aqueous fluoroelastomer dispersion blended with a polyamine compound (e.g., hexamethylenediamine carbamate, N,N-dicynnamylidene-1,6-hexanediamine) as a vulcanizing agent (cf. DuPont's "Viton," Bulletin, No. 5, April, 1961).

Currently, fluorocarbon elastomer substrates have been applied as a thin layer to surfaces using an organic solvent spray or other liquid organic process. Normally, the fluorocarbon elastomer is first dissolved in volatile organic solvents, such as acetone, methyl ethyl ketone, methyl isobutyl ketone and the like, to facilitate the deposition of the thin films of fluoroelastomer on the substrates to be coated and to enable the solvent to evaporate into the atmosphere within a reasonable period of time. The use of such volatile organic solvents as diluents can result in air pollution.

The drawbacks of using organic solvents or other liquid organic processes to coat surfaces with fluoroelastomers includes the high cost relative to other coating processes that contain water as the primary solvent or diluent, associated with the organic solvent and the attendant vapor filters. In addition, as the concern over hydrocarbon air pollution by state and federal governmental agencies and private interest groups increases, and as environmental and health regulations on air pollution resulting from volatile organic solvents tighten over time, a need exists for fuser containing fluoroelastomers on surfaces that do not result in excessive volatile organic solvent emission. Further, a need exists for the generation of fluoroelastomers such as the environmentally friendly fluoroelastomers described, wherein these fluoroelastomers have the desirable properties necessary for a surface for a fusing system member, including high toughness, along with excellent chemical, physical and thermal stability, and properties allowing for a decrease in the problems associated with hot offset. In addition, there exists a need for a fuser surface which minimizes the necessity for use of a release agent. These and other needs can be achieved with the present embodiments thereof.

SUMMARY OF THE INVENTION

Figure 1:
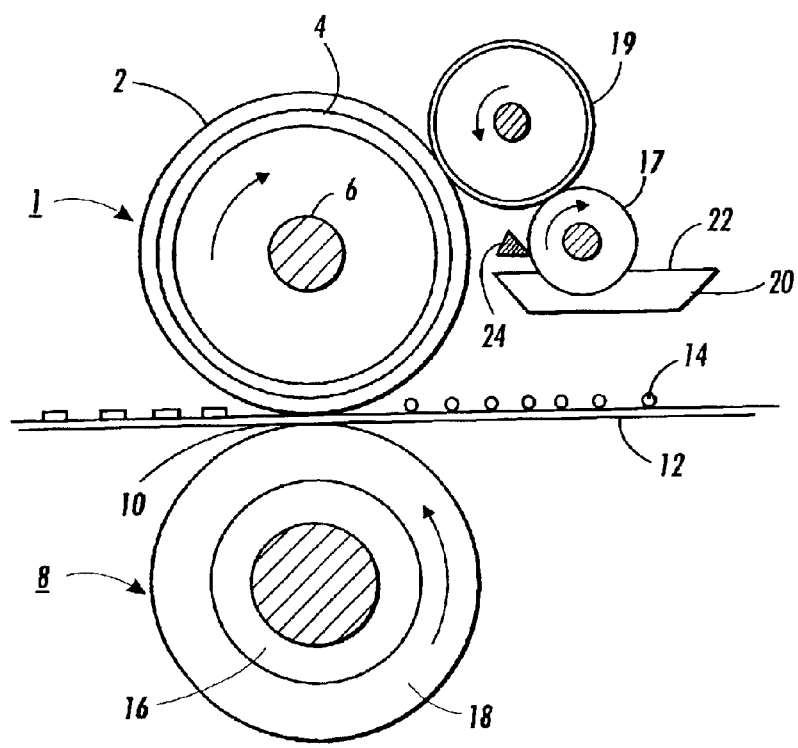
FIG. 1 represents a sectional view of a fuser system with a fuser member of an embodiment of the present invention.

Aspects of the present invention relate to a latex based fluorocarbon system crosslinked with a non-amino based crosslinker that can also produce coatings with increased thermal stability when compared to devices crosslinked with amino crosslinked systems.

In embodiments, the present invention relates to latex fluorocarbon elastomers crosslinked with carbon based crosslinkers, non-amino siloxanes, and methods thereof. In other embodiments, the present invention relates to methods for applying crosslinked fluorocarbon elastomer surfaces on a substrate, reducing the emission of volatile organic solvents by dispensing with the need for those volatile solvents. The crosslinked fluorocarbon elastomers are useful as surfaces for components in electrostatographic processes, especially xerographic processes, including the surfaces of fuser system members, or fuser members, including donor rolls, belts and other equivalent means recognized in the art; pressure rolls, belts and other equivalent means recognized in the art; fuser rolls, belts and other equivalent means recognized in the art; toner transfer rollers, belts and other equivalent means recognized in the art; along with intermediate transfer components such as intermediate transfer belts.

The present invention pertains to a fuser system member of an electrostatographic apparatus. The fuser system member includes a supporting substrate and an environmentally friendly outer surface of a crosslinked hybrid composition containing a latex fluorocarbon elastomer and a non-amino based crosslinker.

In embodiments, the crosslinker is carbon based, either polymeric or non-polymeric. The crosslinker can be an epoxy, most preferably a polyfunctional epoxy having at least two functional groups and either a carbon or a siloxane polymeric backbone, or a combination thereof. Repeating backbone groups can vary in number from about 1 to about 1000 with a preferred range of from about 5 to about 45. Hydroxy, alkoxy and hydrofunctional siloxanes and silanes are also included. In particularly preferred embodiments the crosslinker is siloxane based, either polymeric or nonpolymeric. The crosslinker may be diepoxy or disilylalkoxy or a combination thereof.

Examples of crosslinkers include epoxy terminated hydrocarbons, diols, and silanol, methoxy or ethoxy terminated siloxanes, including those encompassed by the following formula:

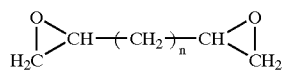

wherein n represents the number of segments and is a number for example between about 2 and about 20, and preferably, n is a number between about 5 and about 10; and:

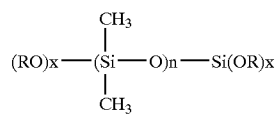

wherein n represents the number of segments and is a number for example between about 1 and about 1000, x represents the number of segments and is a number for example between about 1 and about 3, R is either H, $CH_3$ or $(CH_2)_y CH_3$, and y represents the number of segments and is a number between about 1 and about 3. In the case where x is less than 3, the remaining of the 3 groups on the Si atom are $CH_3$.

In a particularly preferred embodiment the crosslinker has the formula:

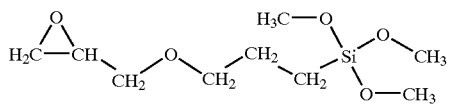

Crosslinkers which are combinations of the formulas described above are also within the scope of the invention, in ratios ranging from about 1–99 and about 99–1, about 50–70, and from about 30–50.

In preferred embodiments, examples of latex fluorocarbon elastomers are a copolymer of vinylidene fluoride and hexafluoropropylene, a terpolymer of vinylidene fluoride, hexafluoropropylene and tetrafluoroethylene or a tetrapolymer of vinylidene fluoride, hexafluoropropylene, tetrafluoroethylene and a cure site monomer. As is known in the art, a cure site monomer is susceptible to free radical attack and is commonly used in fluoroelastomer peroxide cure systems, e.g., 1-bromo-2,2-difluoroethylene. In other embodiments, the latex fluorocarbon elastomer is a copolymer of vinylidene fluoride, hexafluoropropylene and tetrafluoroethylene, wherein the latex fluorocarbon elastomer has a fluorine content of from about 50 to about 71 weight percent; the outer surface of the fuser system member is from about 5 to about 250 micrometers thick, most preferably, about 15 to about 50 micrometers thick, and the supporting substrate is a cylindrical roll or an endless, flexible belt. The cylindrical roll may be aluminum, copper or steel, and the belt may be polyimide.

In another embodiment, the fuser system member additionally contains from about 1 to about 10 intermediate layers positioned between the supporting substrate and the outer surface. At least one of the intermediate layers is preferably an elastomer layer such as a silicone elastomer or an adhesive layer or an epoxy resin or a silane. The outer surface of the fuser system member may vary from about 5 to about 250 micrometers thick, most preferably, about 15 to about 50 micrometers thick. Other intermediate layers may be applied to achieve desired adhesive and/or elastomeric properties and performance objectives such as to provide conformity, thermal conductivity, or oil boundary layers, or to act as adhesive layers, binding layers, and/or toughness improving layers.

The present invention also relates to a composition of matter and an environmentally friendly process for coating a fuser member support with a crosslinked fluorocarbon elastomer outer surface on a fuser member supporting substrate. The process includes the steps of mixing an acid acceptor, an emulsifier and water to form one dispersion; forming another, separate dispersion comprising an a non-amino polymeric based crosslinker; reacting a latex fluorocarbon elastomer with the two second dispersions to form a homogeneous crosslinked fluorocarbon elastomer; and subsequently providing at least one layer of the homogeneous crosslinked fluorocarbon elastomer onto said fuser member supporting substrate. The layer of homogeneous crosslinked fluorocarbon elastomer on the fuser member supporting substrate may be heat cured, and the acid acceptor is preferably zinc oxide.

The emulsifier may include octylphenoxpolyethoxyethanol-polyethylene glycol, sodium laurylsulphate or ammonium laurylsulphate, the crosslinker is preferably siloxane based, e.g., hydroxysiloxane, hydrosiloxane or epoxy, and the water is preferably deionized water. In another embodiment, a metal oxide filler is added to the dispersion containing the non-amino polymeric crosslinker, where the metal oxide filler may include iron II oxide, iron III oxide, titanium dioxide or chromium oxide.

The present invention pertains to a material and an environmentally friendly method for providing a crosslinked fluorocarbon elastomer outer surface on a fuser member supporting substrate including the steps of mixing an acid acceptor, an emulsifier, water and a non-amino based crosslinker to form a dispersion; adding and reacting a latex fluorocarbon elastomer with the dispersion to form a homogeneous crosslinked fluorocarbon elastomer; and subsequently providing at least one layer of the homogeneous crosslinked fluorocarbon elastomer onto said fuser member supporting substrate.

The invention also pertains to an image forming apparatus for forming images on a recording medium including a charge-retentive surface to receive an electrostatic latent image; a development component to apply toner to the charge-retentive surface to develop the electrostatic latent image to form a developed image on the charge retentive surface; a transfer component to transfer the developed image from said charge retentive surface to a substrate; and a fusing component to fuse the developed image to said substrate in which the hybrid composition contains a latex fluorocarbon elastomer and a non-amino based crosslinker.

The present invention pertains to a process for transferring at least one toned image from a photoconductor element surface including rolling a heated intermediate transfer roller over the element while the temperature of the circumferential surface portions of the roller is sufficient to sinter the toner particles which form such toned image to each other, and rolling the heated, toned image bearing roller over the receiver to transfer the tone image to the receiver in which the intermediate transfer roller includes a crosslinked hybrid composition of a latex fluorocarbon elastomer and a non-amino based crosslinker.

DETAILED DESCRIPTION OF THE INVENTION

Aspects of the present invention relate to fuser members, fuser member coatings, and processes for providing elastomeric coatings on fuser members. The present invention relates to members comprised of a substrate and thereover a latex based fluorocarbon surface crosslinked with a non-amino based crosslinker that can produce coatings with increased thermal stability. Siloxane can be incorporated in the polymer matrix to reduce the surface energy of the coating and for controlled compatibility, i.e., wetting, with siloxanes which permits the use of nonfunctional release agents. Because the process differs from others employing quantities of volatile carbon solvent effluent, the process for formulating the latex based fluorocarbon crosslinked system greatly reduces the levels of volatile carbon solvent effluent released into the environment. Levels are reduced both in the process of preparing the coating formulation and in the process of coating substrates with the coating. The processes are both environmentally friendly and cost-effective.

The present invention relates to a fuser system member having an outer layer comprising a crosslinked composition derived from a latex fluorocarbon elastomer and non-amino polymeric based crosslinker.

A known fusing system is comprised of fusing system members, including a supporting substrate such as a heated cylindrical fuser roll, film or belt having a fusing outer surface which is backed by a cylindrical pressure roll forming a fusing nip there-between. A release agent donor roll is also provided to deliver release agent to the fuser roll. While the physical and performance characteristics of each of these fusing system members, and particularly of their surfaces are not precisely the same depending on the various characteristics of the fusing system desired, the same classes of materials are typically used for one or more of the rolls in a fusing system in an electrostatographic printing system.

The present invention enables surfaces as described in conjunction with a fuser assembly as shown in FIG. 1 where the numeral 1 designates a fuser roll comprising fluorocarbon elastomer surface 2 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder.

Backup or pressure roll 8 cooperates with fuser roll 1 to form a nip or contact arc 10 through which a copy paper or other substrate 12 passes such that toner images 14 thereon contact fluorocarbon elastomer surface 2 of fuser roll 1. As shown in FIG. 1, the backup roll 8 has a rigid steel core 16 with a fluorocarbon elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to fluorocarbon elastomer surface 2, two release agent delivery rolls 17 and 19 rotatably mounted in the direction indicated are provided to transport release agent 22 to fluorocarbon elastomer surface 2. Delivery roll 17 is partly immersed in the sump 20 and transports on its surface release agent from the sump to the delivery roll 19. By using a metering blade 24, a layer of polymeric release fluid can be applied initially to delivery roll 19 and subsequently to fluorocarbon elastomer 2 in controlled thickness ranging from submicrometer thickness to a thickness of several micrometers of release fluid. Thus, by metering device 24, about 0.1 to about 2 micrometers or greater thicknesses of release fluid can be applied to the surface of fluorocarbon elastomer 2.

Generally, in the process for forming the fuser system member surface, the latex fluorocarbon elastomer is added last. Initially, two dispersions can be formed and subsequently, the latex fluorocarbon elastomer added. Alternatively, a single dispersion is formed and subsequently, the latex emulsion is added.

If using two separate dispersions, an acid acceptor and an emulsifier or surfactant are added initially with water to make one dispersion. Curing and crosslinking agents (non-amino polymeric based) can then be mixed with optional fillers and pigments to form another separate dispersion. The latex fluorocarbon elastomer is then added together with the above two dispersions with gentle stirring. An anti-foaming agent such as Dow Corning 65 additive—a water based silicone anti-foam additive (Dow Corning Corporation, Midland Mich. 48686) or the equivalent—can be added.

An alternative and one preferred method is to mix together with gentle stirring an acid acceptor (a basic metal oxide), water, emulsifier, and curing and crosslinking agents (non-amino polymeric based). The dispersion can be allowed to cool before addition of the latex fluorocarbon elastomer. Next, the resulting dispersion is either allowed to air dry or cured in order to evaporate the water, and is post cured with heat.

A latex fluorocarbon elastomer is used in the present invention. The term latex is intended to include a water-based stabilized dispersion of an elastomeric compound. The term latex also includes an essentially aqueous mixture e.g., one which lacks an organic solvent medium. Examples of suitable latex fluorocarbon elastomers include copolymers of vinylidene fluoride and hexafluoropropylene; terpolymers of vinylidene fluoride, hexafluoropropylene and tetrafluoroethylene; and tetrapolymers of vinylidene fluoride, hexafluoropropylene and tetrafluoroethylene and a cure site monomer. It is preferred that the latex fluoroelastomers have a fluorine content of from about 50 to about 71 percent by weight. Specific latex fluoroelastomers are manufactured and are commercially available from Ausimont of Morristown, N. J., including TECNOFLON TN (having 70% solids by weight). The amount of latex fluoroelastomer used to provide the surface of the present invention is dependent on the amount necessary to form the desired thickness of the layer or layers of surface material. The solids content of the final latex fluoroelastomer is from about 10 to about 70 weight percent, preferably from about 50 to about 60 weight percent. The selected fluoroelastomer content can be readily obtained by concentration or dilution. When desired, the latex fluoroelastomer may contain any conventional additive such as a pigment, an acid acceptor or a filler in addition to the fluoroelastomer.

The latex fluoroelastomer of the present invention is crosslinked with a non-amino based crosslinker which may be a carbon or a siloxane based crosslinker such as hydroxysiloxane, hydrosiloxane or epoxy.

Examples of crosslinkers include epoxy terminated hydrocarbons, diols, and Examples of crosslinkers include epoxy terminated hydrocarbons, diols, and silanol, methoxy or ethoxy terminated siloxanes, including those encompassed by the following formula:

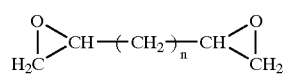

wherein n represents the number of segments and is a number for example between about 2 and about 20, and preferably, n is a number between about 5 and about 10; and:

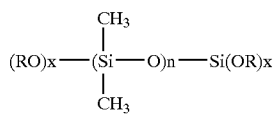

wherein n represents the number of segments and is a number for example between about 1 and about 1000, x represents the number of segments and is a number for example between about 1 and about 3, R is either H, CH$_3$ or (CH$_2$)$_y$CH$_3$, and y represents the number of segments and is a number between about 1 and about 3. In the case where x is less than 3, the remaining of the 3 groups on the Si atom are CH$_3$.

In a particularly preferred embodiment, the crosslinker has the formula:

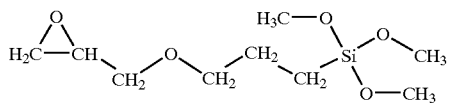

One such crosslinker is called DC Z 6040 Glycidoxypropyl trimethoxysilane and is produced by Dow Corning Corporation, Midland, Mich. 48686.

While not wishing to be bound by theory, it is hypothesized that trace amounts (or more) of hydrofluoric acid present in the latex fluorocarbon elastomer system activate the epoxy functional group. This activated epoxy group attacks the tertiary carbon in the fluorocarbon elastomer chain, followed by a double bond rearrangement, thereby initiating the nucleophilic addition reaction. The reaction continues under additional heat, thus, a crosslinked network is formed.

In preferred embodiments, the latex fluorocarbon elastomer is a copolymer of vinylidene fluoride and hexafluoropropylene, a terpolymer of vinylidene fluoride, hexafluoropropylene and tetrafluoroethylene or a tetrapolymer of vinylidene fluoride, hexafluoropropylene, tetrafluoroethylene and a cure site monomer. In a particularly preferred embodiment, the latex fluorocarbon elastomer is a copolymer of vinylidene fluoride, hexafluoropropylene and tetrafluoroethylene. The latex fluorocarbon elastomer has a fluorine content of from about 50 to about 71 weight percent.

The outer surface of the fuser system member is from about 5 to about 250 micrometers thick, preferably about 15 to about 50 micrometers thick. The supporting substrate may be a cylindrical roll or an endless, flexible belt. The cylindrical roll may be aluminum, copper or steel. In a particularly preferred embodiment, the belt is polyimide.

In other embodiments, the fuser system member contains from about 1 to about 10 intermediate layers positioned between the supporting substrate and the outer surface. At least one of the intermediate layers may be an elastomer layer such as a silicone elastomer or an adhesive layer, for example, an epoxy resin or a silane. The outer surface of the fuser system member is from about 5 to about 250 micrometers thick, most preferably about 15 to about 50 micrometers thick.

The invention also relates to methods for providing an environmentally friendly crosslinked fluorocarbon elastomer outer surface on a fuser member supporting substrate. The method includes the steps of mixing an acid acceptor, an emulsifier and water to form one dispersion; forming another separate dispersion comprising a non-amino based crosslinker; and reacting a latex fluorocarbon with the two dispersions to form a homogeneous crosslinked fluorocarbon elastomer. The method may also include the step of providing at least one layer of the homogeneous crosslinked fluorocarbon elastomer onto a fuser member supporting substrate.

An emulsifier or surfactant may be added in order to form a dispersion. In addition, the emulsifier functions to provide increased dispersion of the fillers, acid acceptor, and curing and crosslinking agents. Examples of suitable emulsifiers include sodium laurylsulphate, potassium laurylsulphate, ammonium laurylsulphate, or preferably Triton.RTM.X-100 (octylphenoxypolyethoxy-ethanol-polyethylene glycol) manufactured by Union Carbide Chemicals & Plastics Company, Inc., of Danbury, Conn. The emulsifier is added in various effective amounts, for example, an amount of from about 1 to about 10 parts per hundred fluorocarbon polymer with the preferred range being from about 1 to about 3 parts per hundred fluorocarbon elastomer.

Although any type of water may be used, e.g., tap water, purified water such as single, double, and triple distilled water, and deionized water, it is preferred that ambient deionized water of at least one meg ohm purity be used. The amount of water added is preferably equal to the total amount by weight of the acid acceptor and emulsifier, and is added in an amount of from about 2 to about 20 parts per hundred of elastomer.

Other adjuvants and fillers may be incorporated in the fluorocarbon elastomer in accordance with the present invention provided they do not substantially affect the integrity of the latex fluorocarbon elastomer. Such fillers normally encountered in the compounding of fluorocarbon elastomer include coloring agents, reinforcing fillers, alumina or other additives to increase thermal conductivity and processing aids. Oxides such as copper oxides may be added in certain amounts to the coatings of fuser members to provide sufficient anchoring sites for functional release oils, and thereby allow excellent toner release characteristics from such fuser members. However, the present invention provides an outer layer of a fuser member, wherein the outer layer has exceptional release properties. Therefore, little or no functional fuser oil (having substantially no chemical reactivity) may be necessary. Optional reinforcing fillers may be added prior to addition of the latex fluorocarbon elastomer. Specific examples of preferred fillers include fillers having a pH of from about 5 to about 8. Examples of suitable fillers such as pigments include, for example, zinc oxide, iron II and iron III oxide, titanium dioxide and chromium oxides. Other suitable fillers include clays and silicates such as calcium metasilicate or Neuburg clay. The fillers can be added in an amount of from about 1 to about 40 parts per hundred fluorocarbon elastomer with preferred being from about 25 to about 30 parts per hundred fluorocarbon elastomer.

The latex fluorocarbon elastomer may be applied to a substrate by spraying, dipping, flow coating, silk screening or equivalent methods recognized in the art. The coating is first air-dried and then heat cured (crosslinked). The air drying time may be from about 30 minutes to about 48 hours, preferably from about 1 to about 24 hours. The temperature for air-drying may be from about 20 to about 60° C., preferably from about 40 to about 50° C. The fluorocarbon elastomer may be subsequently heat cured. The heat curing time may be from about 30 minutes to about 24 hours, preferably from about 1 to about 6 hours, and most preferably from about 1 to about 2 hours. The temperature of the heat cure may be from about 25° to about 150° C., preferably from about 50° to about 100° C., and most preferably from about 60° to about 90° C. The post curing can be at a temperature of from about 100° to about 250° C. and at a time of from about 1 hour to about 24 hours. The preferred post curing time is for about 1 hour at a temperature of about 250° C.

The outer surface of the latex fluorocarbon elastomer is preferably from about 5 to about 250 and preferably about 15 to about 50 micrometers thick. This range is selected because it provides a layer thin enough to prevent a large thermal barrier for fusing, while providing a layer thin enough to allow a reasonable wear life.

The fluorocarbon elastomer produced by this process may be evaluated with ASTM F219 using the Instron 1122 (American Society for Testing of Materials)

The fuser system member substrate on which the latex fluorocarbon elastomer is coated may be a roll, belt, flat surface or other suitable shape used in the fixing of thermoplastic toner images to a suitable substrate. It may take the form of a cylindrical sleeve, a drum, a belt or an endless belt. Specific examples of the fuser system member include a fuser member, a pressure member, a release agent donor member, preferably in the form of a cylindrical roll such as, for example, a fuser roll, a donor roll and a pressure roll. It may also take the form of an intermediate transfer belt. Typically, the fuser system member is made of a hollow cylindrical metal core, such as copper, aluminum, steel, or certain plastic materials chosen to maintain rigidity, structural integrity, as well as being capable of having the crosslinked fluoropolymer coated thereon and adhered firmly thereto. In one embodiment, the core, which may be an aluminum cylinder, is degreased with a solvent and cleaned with an abrasive cleaner prior to being primed with a primer, such as Dow Corning 1200, which may be sprayed, brushed or dipped, followed by air drying under ambient conditions for thirty minutes and then baked at approximately 150° C. for about 30 minutes.

Alternatively, there may be one or more, and possibly up to 10 intermediate layers between the substrate and the outer layer of the crosslinked fluoroelastomer. Optional intermediate adhesive layers and/or elastomer layers may be applied to achieve desired properties and performance objectives of the present invention. An adhesive layer may be selected from a polymeric compound, for example, epoxy resins, silanes and polysiloxanes. Preferred adhesives are proprietary materials such as Union Carbide A-1100, Dow TACTIX 740, Dow TACTIX 741, and Dow TACTIX 742. A particularly preferred curative for the aforementioned adhesive is DOW TACMX 741 and 742, available from Dow Chemical Company.

Typical elastomer layers include materials having thermal and mechanical properties appropriate for such layers, such as silicone elastomers and fluoroelastomers. The thickness of the intermediate layer is from about 5 to about 250 micrometers, preferably about 15 to about 50 micrometers, depending on the required thermal conductivity and other physical properties required for any particular system. A silicone elastomer intermediate layer may be applied according to conventional techniques such as injection molding and casting after which it is cured for up to 15 minutes and at about 120 to about 180° C. to provide a complete cure without a significant post cure operation. This curing operation should be substantially complete to prevent debonding of the silicone elastomer from the core when it is removed from the mold. Thereafter, the surface of the silicone elastomer is sanded to remove the mold release agent and it is wiped clean with a solvent such as isopropyl alcohol to remove all debris. The present fluorocarbon elastomer surfaces are also suitable for use with intermediate transfer components such as an intermediate transfer belt. Examples of intermediate transfer members are found in U.S. Pat. No. 5,110,702, the disclosure of which is hereby incorporated by reference in its entirety. This patent discloses non-electrostatic transfer of a toner image using a roll, as an intermediate transfer member. Examples of intermediate transfer members are also found in U.S. Pat. No. 3,893,761, the disclosure of which is hereby incorporated by reference in its entirety. This patent discloses an intermediate transfer belt having a polyimide film substrate coated with a silicone rubber or a fluoroelastomer. Other examples of intermediate transfer components are found in U.S. Pat. Nos. 4,684,238; 4,690,539; 4,684,238; 4,690,539; 5,119,140; 5,099,286; and 5,150,161, the disclosures of which are hereby incorporated by reference in their entirety.

The resulting fuser system member surface comprises a crosslinked fluorocarbon elastomer that is comprised of a latex fluorocarbon elastomer crosslinked with a non-amino polymeric based crosslinker. In embodiments, the crosslinked fluoroelastomer is a substantially uniform integral interpenetrating network of a hybrid composition, wherein both the structure and the composition of the latex elastomer and the crosslinking agent are substantially uniform when taken through different slices of the fuser member or intermediate belt member.

All patents, applications, references and other documents referred to herein are hereby specifically, and totally incorporated herein by reference in their entirety in the instant specification. The appropriate components, processes, and method thereof of these patent applications and other documents may be selected for the present invention and embodiments thereof.

The invention is further illustrated by the following non-limiting examples. Unless otherwise indicated, all parts and percentages are by weight.

EXAMPLES

Example 1

Preparation of Latex Emulsion/Dispersion

A general but not exclusive approach for preparation of a latex emulsion is to prepare two or more ingredient dispersions and add them to the latex emulsion. For example, an acid acceptor and an emulsifier are mixed into an approximately equal weight of deionized water to form a dispersion. Fillers and curatives are mixed in the same manner to form another dispersion. These two dispersions are then slowly stirred into the latex containing fluoroelastomer, to which an antifoaming agent may be added. This combined dispersion is then ready for coating.

More specifically, fifty grams (10 parts per hundred polymer) of acid acceptor such as zinc oxide, for example zinc oxide from Aldrich, catalog number 20,553-2, and five grams (1 part per hundred polymer) of an emulsifier or surfactant, for example, emulsifier dodecyl sulfate, sodium salt, Aldrich catalog number 86201-0, are added to fifty grams (10 parts per hundred polymer) of deionized water in a glass bottle and rolled twenty four hours on a roll mill. Twenty grams of this dispersion are slowly stirred into 145 grams of a well dispersed TN Latex Tecnoflon from Ausimont. Twenty grams (20 parts per hundred fluoroelastomer) a non-amino polymeric based crosslinker, and one half gram (0.5 parts per hundred polymer) of an antifoaming agent such as BYK 3105 from BYKCHEMIE are then slowly added with thorough mixing to the TN Latex dispersion. The final dispersion is then ready for coating a substrate. The coating is oven dried for 1 hour and 45 minutes at 130° F., 54° C., and is cured and post cured for 18 hours at 194° F., 90° C. The resulting layer was determined to be a crosslinked latex fluoroelastomer/polydimethylsiloxane surface.

Example 2
Effects of Process Conditions on Latex Fluoroelastomer Coatings

Three samples of the non-amino polymeric based crosslinked formulations from Example 1 are prepared. Samples A and C are dried according to Example 1, and sample B is dried overnight at ambient temperature. Both A and B are then cured and post cured for 16 hours at about 200° F., 93° C., while C is cured/post cured for 16 hours at about 400° F., 204° C. Bubble formation in the sample can be used as the criterion for quality measurement, in that little or no bubble formation demonstrates good workable quality. For purposes of illustration, other characteristics of good workable quality include good consistency and no apparent, substantial separation of components within at least a time frame adequate to employ the method and/or apply the coating of the present invention.

Example 3
Evidence of Crosslinking in Latex Fluoroelastomer Coatings

Two samples, differing only in the respect that one contains the non-amino polymeric based crosslinker and the other contains no crosslinker, are prepared, coated, dried, cured and post cured according to the procedures outlined in Example 1. Both samples are soaked in 2-butanone, overnight. The crosslinked sample will not dissolve while the control, the non-crosslinked sample, will completely dissolve, thus evidencing that crosslinking does not occur unless a crosslinker is added.

Example 4
Coating Fuser Member for Use in Electrophotographic Processes

A formulation as in Example 1 or 2 is coated onto a multi-layer fuser member by a flow-coating or spray process, and then cured according to the schedule outlined in those examples. The multi-layer fuser member is comprised of a metal core, such as stainless steel or aluminum, onto which an adhesive layer is added. The outermost layer of the fuser member is a coating according to the invention. The formulation may also include carbon black or other filler to impart thermal conductivity to the material. The multi-layer roll is then used as a fuser member in an electrophotographic process.

We claim:

1. A method comprising:
   mixing an acid acceptor, an emulsifier and water to form a dispersion;
   providing a non-amino polymeric based crosslinker selected from the group consisting of hydroxy silanes and epoxys;
   reacting a latex fluorocarbon elastomer with said dispersion and the non-amino polymeric based crosslinker to form a crosslinked fluorocarbon elastomer; and
   providing at least one layer of the crosslinked fluorocarbon elastomer onto a substrate having an outer surface.

2. A method in accordance with claim 1, further comprising heat curing the layer of crosslinked fluorocarbon elastomer on the outer surface of said substrate.

3. A method comprising:
   mixing an acid acceptor, an emulsifier, water and a non-amino based crosslinker selected from the group consisting of hydroxy silanes and epoxys to form a dispersion;
   adding and reacting a latex fluorocarbon elastomer with said dispersion to form a crosslinked fluorocarbon elastomer; and
   providing at least one layer of the crosslinked fluorocarbon elastomer onto a fuser member supporting substrate.

4. A method in accordance with claim 3, wherein the crosslinker is:

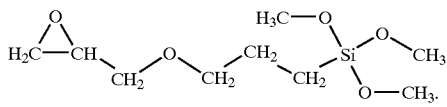

5. A method in accordance with claim 3, wherein said latex fluorocarbon elastomer is selected from the group consisting of a) copolymers of vinylidene fluoride and hexafluoropropylene; b) terpolymers of vinylidene fluoride, hexafluoropropylene and tetrafluoroethylene; and c) tetrapolymers of vinylidene fluoride, hexafluoropropylene, tetrafluoroethylene and cure site monomers.

6. A method in accordance with claim 5, wherein said latex fluorocarbon elastomer is a terpolymer of vinylidene fluoride, hexafluoropropylene, tetrafluoroethylene, and a cure site monomer.

7. A method in accordance with claim 3, wherein said acid acceptor is zinc oxide.

8. A method in accordance with claim 3, wherein said emulsifier is selected from the group consisting of octylphenoxypolyethoxy-ethanol-polyethylene glycol, sodium laurylsulphate, and ammonium laurylsulphate.

9. A method in accordance with claim 3, further comprising adding a metal oxide filler to said non-amino crosslinker dispersion.

10. A method in accordance with claim 9, wherein said filler is selected from the group consisting of copper oxide, iron oxide and aluminum oxide.

11. A method in accordance with claim 3, further comprising adding a pigment to said non-amino crosslinker dispersion.

12. A method in accordance with claim 11, wherein said pigment is selected from the group consisting of iron II oxide, iron III oxide, titanium dioxide and chromium oxides.

13. A method in accordance with claim 3, wherein said water is deionized water.

14. A method in accordance with claim 3, further comprising heat curing the layer of crosslinked fluorocarbon elastomer on the outer surface of said fuser member supporting substrate.

* * * * *